United States Patent [19]

Meinunger

[11] 3,941,492
[45] Mar. 2, 1976

[54] TRIPOD WITH ADJUSTABLE, POLYGONAL, TELESCOPING LEGS

[75] Inventor: Helmut Meinunger, Radevormwald, Germany

[73] Assignee: Kurbi & Niggeloh, Radevormwald, Germany

[22] Filed: Aug. 8, 1974

[21] Appl. No.: 495,827

[30] Foreign Application Priority Data
Nov. 8, 1973 Germany............................ 2355900
Feb. 12, 1974 Germany............................ 2406609

[52] U.S. Cl. ............. 403/104; 248/188.5; 248/411; 248/354 S; 403/322; 403/374; 403/380; 403/404
[51] Int. Cl.² ...................... F16B 7/14; F16M 11/26
[58] Field of Search. 248/161, 172, 188.5, 407–411, 248/354 S; 403/104, 109, 322, 325, 327, 373, 374, 380, 404

[56] References Cited
UNITED STATES PATENTS

| 2,260,241 | 10/1941 | Bargen............................... 248/411 |
| 2,445,543 | 7/1948 | Thines.............................. 403/109 |
| 2,940,708 | 6/1960 | Grimal.............................. 248/177 |
| 3,491,614 | 1/1970 | Saunders et al. .................. 403/325 |

Primary Examiner—Andrew V. Kundrat
Assistant Examiner—Conrad L. Berman
Attorney, Agent, or Firm—Millen, Raptes & White

[57] ABSTRACT

In a tripod with adjustable telescoping legs wherein each of said legs comprise an inner and outer leg, both being of prismatic configuration and a polygonal cross-section. Said inner and outer legs are adapted to be wedged together in a locking position by a releasable, spring-biased, roller bar disposed between said legs.

8 Claims, 8 Drawing Figures

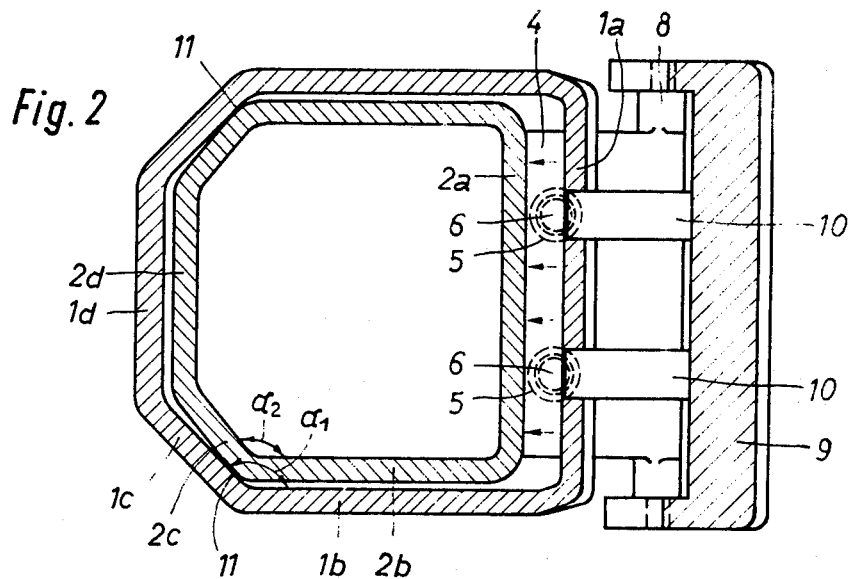
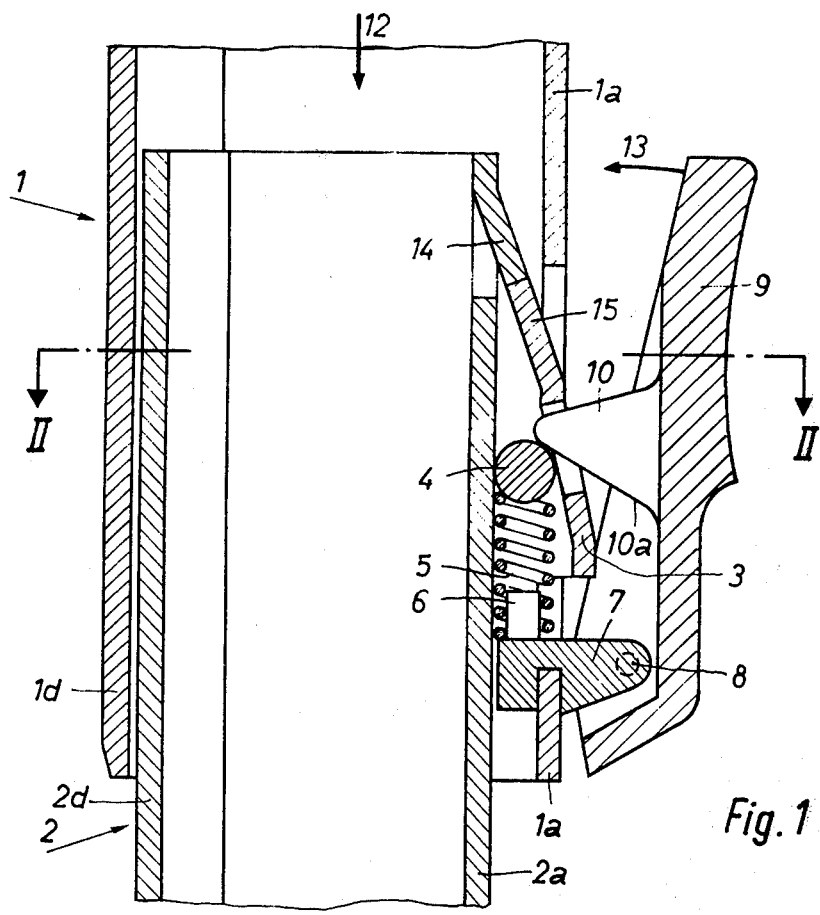

TRIPOD WITH ADJUSTABLE, POLYGONAL, TELESCOPING LEGS

This invention relates to a tripod with extensible tripod legs consisting of telescopic, closed profile members of a prismatic cross section, wherein the profile members have a base surface, followed by lateral surfaces which extend preferably at a right angle.

Conventional profiles of this type consist of quadrilateral tubes of a normally square cross section, wherein the inner section is pressed with one face thereof against the outer section. To prevent the sections, especially when the inner section has been extended, from assuming a mutually inclined position after the clamping action has been established, the inner section may have only a small amount of play in the outer section. As a consequence, the dimensions of both parts must be maintained very accurately. The contacting surfaces must furthermore be fashioned very planar to ensure satisfactory mutual contact.

This invention is based on the problem of providing a profile wherein, in spite of a low dimensional accuracy of the tripod parts, a high degree of tripod stability is attained. This is made possible by providing that respectively one clamping [gripping] surface adjoins the lateral surfaces of the profile members, this clamping surface forming an obtuse angle with the lateral surface, and that the obtuse angles of two telescoping sections deviate from each other. This angle can be relatively small and can be on the order of about 5°. The profile members are pressed against each other from the direction of the base surface. Thus, they contact each other respectively along a line determined by the angle of inclination of the clamping surface. Since the two contact surfaces are disposed on both sides of a plane of symmetry imagined through the base surface, a mutual inclination of the two profile members is effectively prevented after the parts have been clamped into position, even if the inner profile member, in the unclamped condition, has a large amount of play with respect to the outer profile member. The dimensional tolerances can, therefore, be large.

According to a particularly simple and advantageous further development of the invention, the feature is provided, for the fixing of the two profile members in position, that a portion of the base surface of the outer profile member extends at an acute angle to the remaining base surface, and forms a contact surface for a roller inserted in the wedge-shaped space formed by the contact surface and the base surface of the inner profile member and forced in the direction toward the narrowed portion of this space by the bias of a spring.

According to an advantageous further development of the invention, the roller is displaceable against the force of the spring by means of a release device. This unlocking device can essentially comprise a lever pivotable about a kingpin, at least one wedge-shaped lug being attached to the inside of this lever. The lug penetrates openings in the contact surface and contacts the roller. By impressing the lever in the direction toward the tripod leg, the wedge-shaped surface causes the roller to move in the direction of the widened portion of the wedge-like space present between the contact surface and the base surface of the profile member, and thus releases the fixed positioning of the two profile members effected by the roller. The displacement of the roller can also be accomplished by a push button movable along the outer profile member.

According to an especially advantageous embodiment of the clamping means, the base surface of the outer profile member is bent open in a wedge-like configuration, and a clamping element is disposed therein which has a slot in which the roller is inserted; this clamping element can be displaced against the force of a spring by means of a release lever.

In accordance with a further development, the clamping element has at least one inclined contact surface on its end edge which can be brought into engagement with a corresponding recess in the lever, which latter is pivotable at right angles to the axis of the tripod legs. The release lever can furthermore have an annular bead held in a cover housing, which latter is connected with the outer profile member. In this arrangement, the cover housing can have a recess permitting the pivoting of the lever by a certain angle. The pivot lever can furthermore be provided with a lug engageable by a notch in the cover housing.

The thus-constructed clamping means has the advantage that it is simple in structure and handling.

Additional details and advantages of the invention can be derived from the examples illustrated in the drawings, to wit:

FIG. 1 shows a longitudinal section through part of a tripod leg according to this invention;

FIG. 2 shows a cross section through the tripod leg illustrated in FIG. 1 along line II—II;

Figure 3:
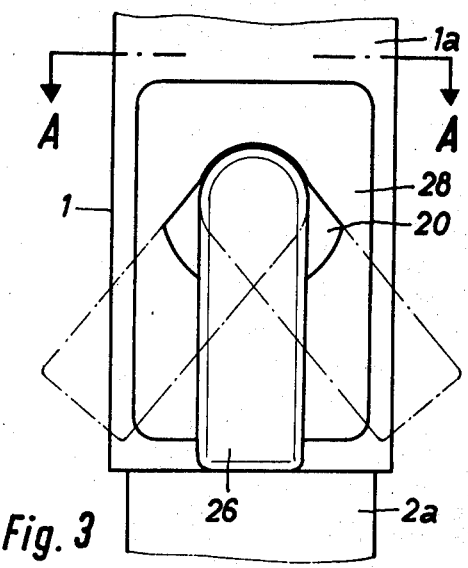
FIG. 3 shows a view of a tripod leg in the zone of the clamping point.
Figure 6:
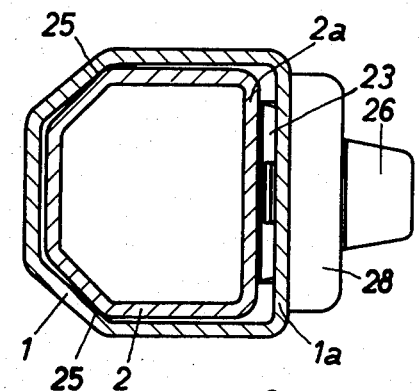
FIG. 6 shows a cross section through the tripod leg of this invention along line A—A in FIG. 3.

In the embodiment shown in the drawings, only one tripod leg is illustrated, consisting of two telescopable sections, the upper section being denoted by 1 and the lower by 2. As can be seen from FIG. 2, both sections have similar profiles, with a base surface 1a and 2a, respectively, lateral surfaces 1b and 2b extending at a right angle thereto, and clamping surfaces 1c and 2c, adjoining under an obtuse angle. The angle $\alpha_1$ between the lateral surface 1b and the clamping surface 1c of the outer profile member is approximately 135°. The angle $\alpha_2$ between the lateral surface 2b and the clamping surface 2c of the inner profile member is approximately 130°.

The profile members are closed off by an end face 1d and 2d, respectively, which likewise form obtuse angles with the clamping surfaces 1c and 2c.

The base surface 1a of the outer profile member has, at the lower end, a contact [abutting] surface 3 punched out on one side and bent open toward the outside. A roller 4, consisting preferably of steel, is inserted between this surface 3 and the base surface 2a; this roller is pressed by two springs 5 in the direction of the apex of the wedge formed by the contact surface 3. The springs 5 are held on extensions 6 connected with a bearing element 7 attached to the base surface 1a of the outer profile member. A lever 9 is pivotably mounted by means of a kingpin 8 in the bearing element 7. This lever carries lugs 10 on the side facing the tripod leg which loosely contact the roller 4 with their edges 10a. The inner profile member 2 is provided on its upper end with an outwardly bent tongue 14 on its base surface 2a. When the profile members 1, 2 are extended, the edge of the tongue 14 is in contact with the edge of a corresponding, inwardly bent tongue 15 disposed in the base surface 1a at the lower end of the profile member 1. This arrangement prevents a complete separation of the extended profile members 1 and 2.

By the pressure of the springs 5, the roller 4 is forced against the base surface 2a of the inner profile member 2 and the contact surface 3 of the base surface 1a of the outer profile member 1. Thereby, the clamping surfaces 2c of the inner profile member are pressed along the line 11 against the clamping surface 1c of the outer profile member 1. By exerting pressure on the tripod leg along the arrow 12 from the top toward the bottom, the two profile members are more firmly wedged against each other and thus the locking action is further increased. To telescope the two profile members into each other, the lever 9 is pressed in the direction of arrow 13 toward the tripod leg. The edge 10a of the lug 10 then presses the roller 4 downwardly against the bias of the spring 5 and lifts the roller off the contact surface 3 and/or off the base surface 2a. Then, the two profile members can be retracted into each other. The extension of the two profile members is also possible without pressing on the lever 9.

In the clamping arrangement shown in FIGS. 3–8, the outer profile member has a wedge-shaped bent-open section 1e in the zone of its base surface, a clamping element 23 being inserted in this bent-open section. The clamping element 23 is provided with a slot 23b and is forced upwardly by a spring 24. A roller 21 is inserted in the slot 23b of the clamping element 23; by the upward shifting of the clamping element 23, this roller comes into contact with the wedge-shaped bent-open section 1e. Thereby, the roller 21 is pressed, with one surface line, against the outer base surface 2a of the inner section 2, and the two profile members 1 and 2 are pressed against each other at the points denoted by 25 and held in mutual contact without the possibility of displacement.

The clamping connection is released by a release lever 26 having a disk-shaped extension 26a wherein a wedge-like recess 27 is disposed. The annular extension 26a of the release lever 26 is mounted by means of a cover housing [box] 28 attached with detents 29 in the base surface 1a of the outer section 1. The cover housing 28 is provided with a sector-shaped recess 20 permitting a pivoting of the release lever 26 into the positions shown in dot-dash lines in FIG. 3 and in full lines in FIG. 4.

Figure 4:
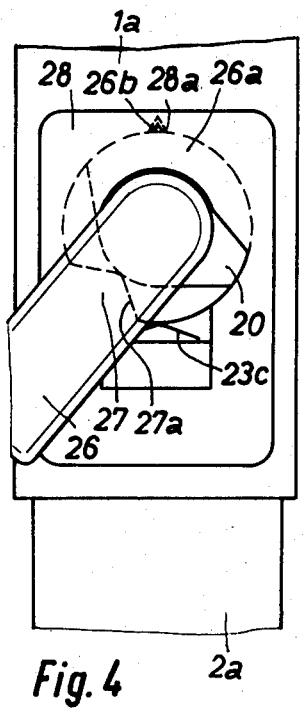
FIG. 4 shows the view illustrated in FIG. 3, with the release lever having been pivoted.
Figure 5:
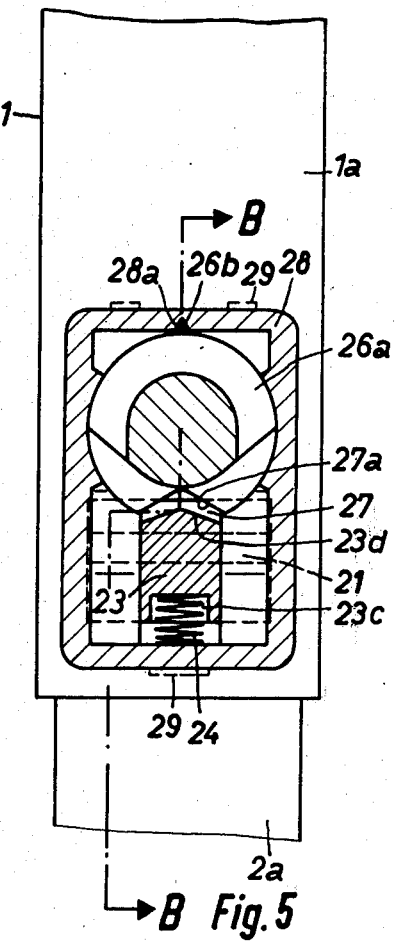
FIG. 5 shows the clamping means shown in FIGS. 3 and 4 in a vertical section.

When the release lever 26 is pivoted into the position illustrated in FIG. 4, the edge 27a of the recess 27 presses on the wedge-shaped upper end face 23d of the clamping element 23 and forces this end face downwardly. Thereby, the clamping element 23 is shifted downwardly in its entirety, entraining the roller 21. The clamping action effected by the roller is thereby released.

The tripod of this invention is assembled by first inserting the clamping element 23 with the roller 21 from the inside in the wedge-shaped section 1e of the outer tube 1. Thereafter, the inner part 2 is inserted and the compression spring 24 is mounted in the spring well 23c of the clamping element 23. The release lever 26 is then passed through the cover housing 28, and both parts together are locked into the corresponding recesses of the outer tripod part 1 by means of the locking lugs 29.

The manipulation of the tripod of this invention is particularly simple since, when the tripod is being folded up, i.e., when parts 1 and 2 are telescoped into each other, the release lever 26 need only pivot into the position shown in FIG. 4, where it remains in a self-locking position without having to be restrained. Therefore, the person using the device has his hands free for holding the tripod and pushing the sections 1 and 2 together. Due to the large torsional moment of the release lever 26, it is readily possible to turn the lever against the force of the spring 24.

In order to hold the release lever 26 in an exactly defined locking position, the annular extension 26a can be provided with a lug 26b which can engage a corresponding recess 28a of the cover housing 28.

The clamping device shown in FIGS. 3–7 operates safely and reliably and does not permit a mutual displacement of the two profile sections even under maximum loads. However, as a result, in case of extraordinarily great stresses, the base surface 2a of the inner profile member 2, or the contact surface 1e can be permanently deformed because, for weight reasons, thin and easily deformable material must normally be utilized for these parts.

Figure 7:
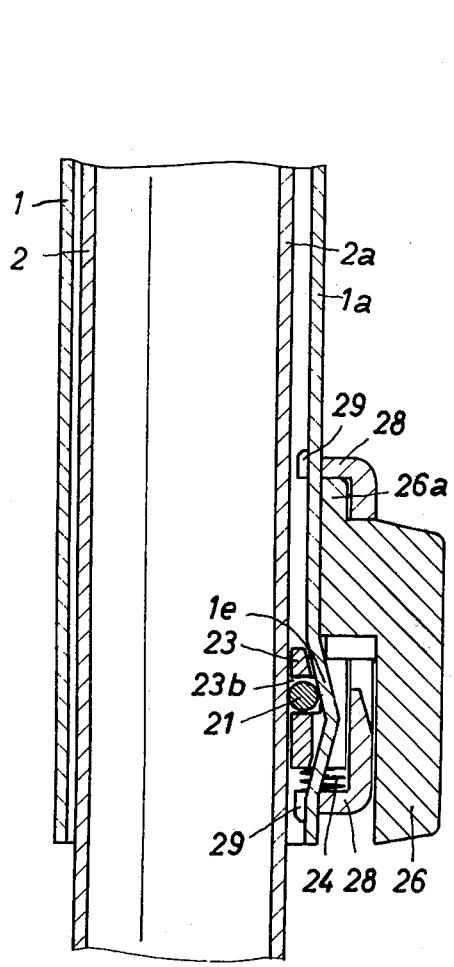
FIG. 7 shows a vertical section through the tripod leg of this invention along line B—B in FIG. 5.
Figure 8:
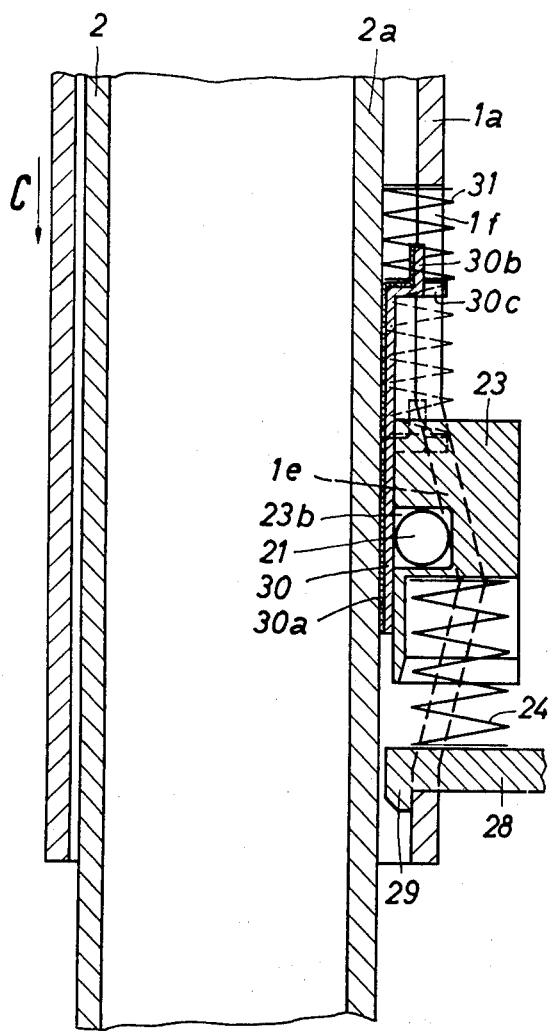
FIG. 8 shows a sectional view corresponding to FIG. 7 with an additional device to prevent overburdening of the clamping means.

In order to avoid such a deformation, a further development of this invention provides an additional device as indicated on an enlarged scale in FIG. 8, which corresponds to FIG. 7. An intermediate plate 30 is inserted between the base surface 2a of the inner profile member and the clamping element 23 and/or the roller 21; this plate consists preferably of a metal and has a synthetic resin coat 30a on the side facing the base surface 2a. This intermediate plate has, on one end, two right-angled bent-open sections 30c displaceable in a recess 1f of the outer profile member 1. The central portion 30b of the bent-open section is bent by another 90° and extends parallel to the clamping plate 30, serving as a guidance for a relatively strong retraction spring 31.

This additional device operates as follows: During a normal load on the outer profile member 1 in the direction of arrow C, a mutual clamping of the two profile sections 1 and 2 is attained in the manner described above by the movement of the roller 21 along the wedge-shaped contact surface 1e, the roller 21 being wedged between the intermediate plate 30 and the contact surface 1e, whereby the intermediate plate 30 is pressed against the base surface 2a of the inner profile member 2. At the beginning of the clamping step, the clamping plate 30 can move from the position shown in dashed lines in FIG. 8, against the force of the spring 31, into the position shown in full lines wherein the bent sections 30c are in contact with the end edge of the recess 1f of the outer profile member 1. When a specific force has been exceeded, which can be set by the selection of the type of coating 30a on the intermediate plate 30 and the surface of the base face 2a of the profile member 2, the intermediate plate 30 slides along the base surface 2a of the inner profile member. Thereby, the profile member 2 is gradually displaced, together with the entire clamping device, toward the profile member 1.

Upon the actuation of the release lever 26, the clamping element 23 — as described above — is moved downwardly and entrains the roller 21. As a result, the clamping action is released, and the intermediate plate 30 is again returned into its initial position by the force of the spring 31, wherein the bent-open section 30c contacts the other edge of the recess 1f of the profile member 1.

What is claimed is:

1. In a tripod with adjustable telescoping legs, each of said legs comprising an inner prismatic leg and an outer substantially similar prismatic leg, said legs having cross-sections which are polygonal, each of said legs having a base surface with lateral surfaces extending therefrom to surfaces forming obtuse angles with said lateral surfaces, said outer leg having surfaces with obtuse angles slightly greater than the obtuse angles of said inner leg surfaces, said base surface of said outer leg comprising an outwardly extending section, a spring-biased roller member disposed transversely between said outwardly extending section and said base surface of said inner leg whereby said roller member upon extension of said legs to any position can be wedged between said outwardly extending section and said inner leg base surface thereby forcing said inner leg obtuse surfaces against said outer leg obtuse surfaces to secure said legs in a clamped position, and release means for depressing said roller member away from said outwardly extending section to thereby release said legs from said clamped position.

2. The tripod of claim 1 wherein said inner and outer surface obtuse angles have a difference of about 5°.

3. The tripod of claim 1 wherein said release means comprises outer pivotable lever means adapted to move through said outer base surface and depress said roller member.

4. The tripod of claim 1 wherein said outwardly extending section comprises outwardly extending lip means.

5. The tripod of claim 1 wherein a spring-biased clamping element is disposed through and on said outer leg base surface, said clamping element comprising a transverse slot adapted to contain said roller member and lever means adapted to be pivotally turned to thereby depress said roller member.

6. The tripod of claim 1 wherein a plate member is disposed between said inner surface and adapted to contact said roller member.

7. The tripod of claim 6 wherein said plate member comprises an antifriction material on its surface.

8. The tripod of claim 6 wherein said plate member comprises an end section adapted to move within slot means in said inner portion of said outer leg base surface.

* * * * *